(12) United States Patent
Kinjo

(10) Patent No.: US 6,989,858 B2
(45) Date of Patent: Jan. 24, 2006

(54) PHOTOGRAPHIC SYSTEM FOR RECORDING DATA AND REPRODUCING IMAGES USING CORRELATION DATA BETWEEN FRAMES

(75) Inventor: Naoto Kinjo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 727 days.

(21) Appl. No.: 09/927,633

(22) Filed: Aug. 13, 2001

(65) Prior Publication Data

US 2002/0036693 A1 Mar. 28, 2002

Related U.S. Application Data

(63) Continuation of application No. 08/955,178, filed on Oct. 21, 1997, now abandoned.

(30) Foreign Application Priority Data

Oct. 25, 1996 (JP) .............................................. 8-284425
Mar. 26, 1997 (JP) .............................................. 9-73035

(51) Int. Cl.
*H04N 5/225* (2006.01)

(52) U.S. Cl. .................................... 348/218.1; 348/239
(58) Field of Classification Search ............ 348/207.89, 348/207.1, 208.99, 218.1, 219.1, 222.1
See application file for complete search history.

(56) References Cited

U.S. PATENT DOCUMENTS

| | | | |
|---|---|---|---|
| 4,383,170 A | | 5/1983 | Takagi et al. |
| 5,253,001 A | | 10/1993 | Alyfuku et al. |
| 5,289,227 A | | 2/1994 | Kinjo |
| 5,515,181 A | | 5/1996 | Iyoda et al. |
| 5,659,770 A | | 8/1997 | Yamada |
| 5,880,778 A | | 3/1999 | Akagi |
| 5,907,353 A | | 5/1999 | Okauchi |
| 5,970,216 A | | 10/1999 | Tanio et al. |
| 5,982,984 A | | 11/1999 | Inuiya |
| 6,686,955 B1 | * | 2/2004 | Fields et al. ............. 348/218.1 |
| 6,720,997 B1 | * | 4/2004 | Horie et al. ............. 348/218.1 |

* cited by examiner

*Primary Examiner*—Tuan Ho
(74) *Attorney, Agent, or Firm*—Sughrue Mion, PLLC

(57) ABSTRACT

In a fine photo mode, a camera photographs a series of frames from the same scene upon one depression of a release button, and records data of correlation between the frames of the same scene in association with the series of frames. When a printer reads the correlation data, the printer composes a high definition image from image data of the series of frames, and make a print of the high definition image. A literal photo mode may be selected for a scene containing a literal image. The camera records data representative of the literal photo mode in association with the frame taken in the literal photo mode, so the printer processes image data to improve sharpness and resolution of the literal image of the frame, and makes a hard copy of the literal image from the processed image data.

12 Claims, 10 Drawing Sheets

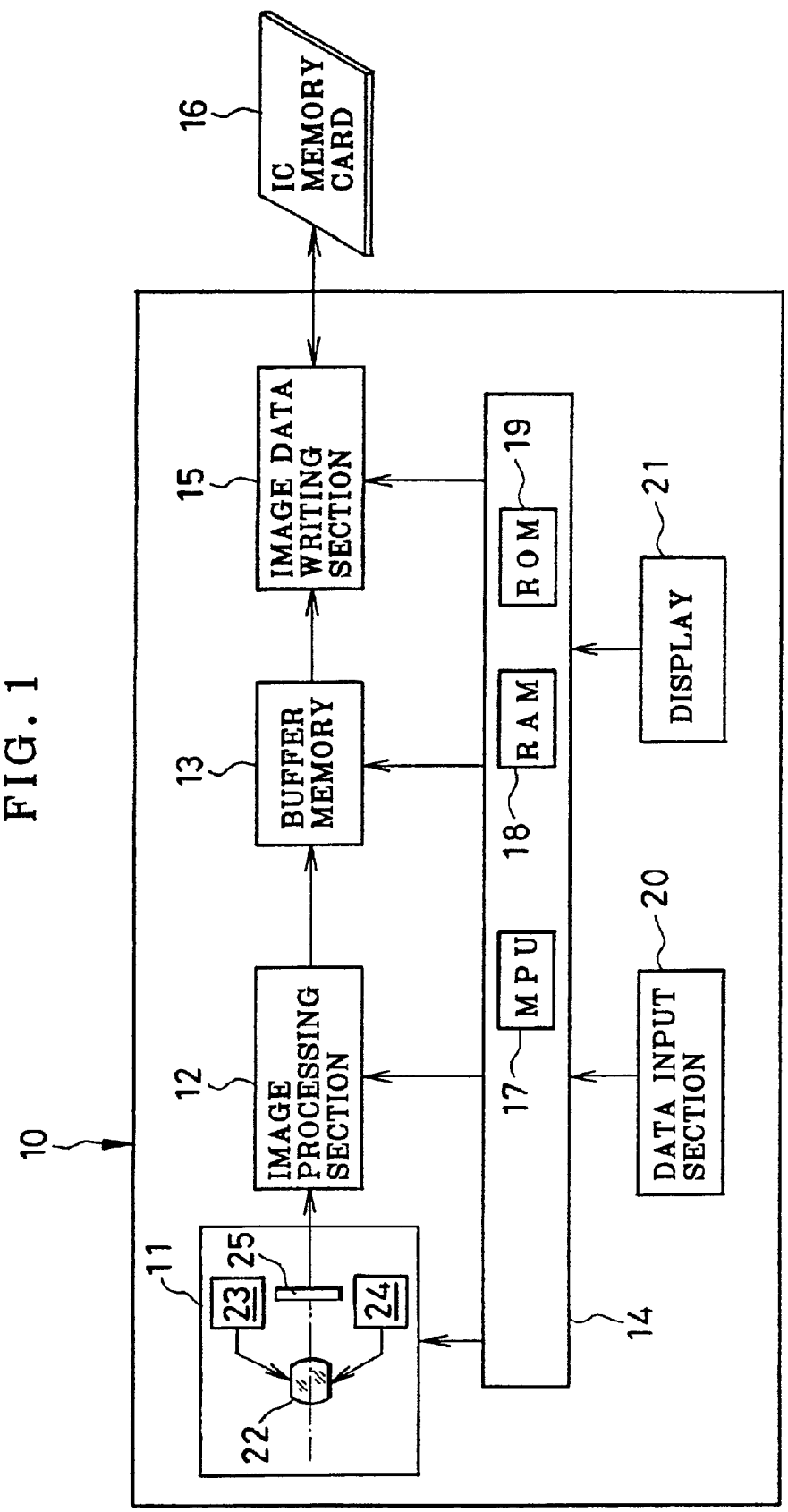

FIG. 2A
FIG. 2B
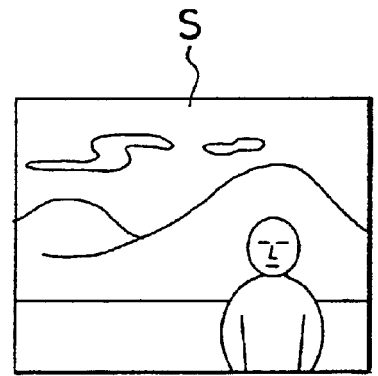
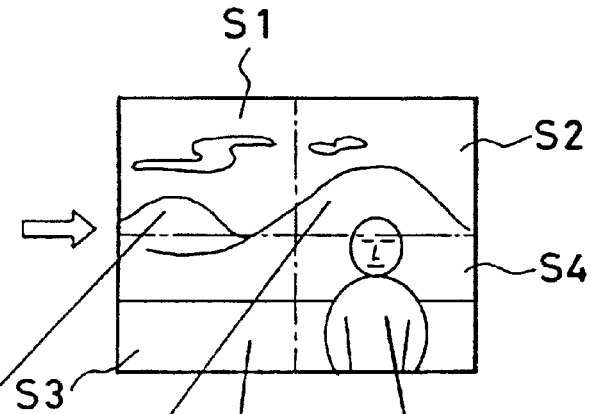
FIG. 2C
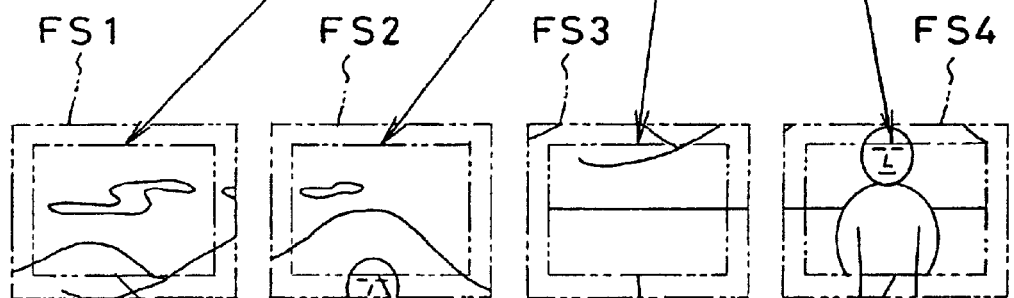
FIG. 2D
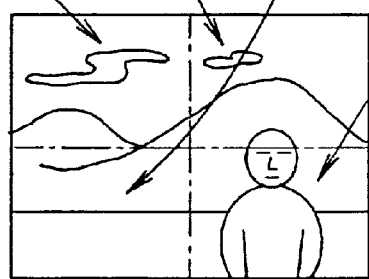

PHOTOGRAPHIC SYSTEM FOR RECORDING DATA AND REPRODUCING IMAGES USING CORRELATION DATA BETWEEN FRAMES

This is a continuation of application Ser. No. 08/955,178 filed Oct. 21, 1997 now abandoned, the disclosure of which is incorporated herein by reference.

BACKGROUND OF THE INVENTION

1. Field of the Invention

The present invention relates to a photographic system consisting of cameras and printers, wherein the camera records photographic data on a recording medium, e.g. magnetic recording layer on photo filmstrip or a memory card or the like, in association with individual image frames, and the printer controls printing according to the photographic data.

2. Background Arts

In the conventional photographic system, granularity or graininess of a photo print is deteriorated as the degree of enlargement increases. This is because there is a limit in grain size or coarseness of grain on the silver-salt photo film. The same problem occurs in the digital cameras because of resolution limit of the imaging device such as a CCD.

To provide a fine granularity large size photo print, a large size silver-salt camera or a digital camera with a high resolving power imaging device is necessary. In either case, the size of camera is inevitably enlarged. In those large size camera, it is difficult to reproduce high brightness images and low brightness images with high definition.

The conventional photographic system is not suitable for recording documents because characters are photographed and processed in the same way as other ordinary image frames, and all the frames are printed on photographic paper regardless of whether they include characters or not. Therefore, the contrast and resolution of the characters are inadequate to read, and the photographic paper is not suitable for treating as the document in terms of surface material and size.

SUMMARY OF THE INVENTION

To achieve the above objects, a photographic system according to the present invention uses a camera having a fine photo mode. In the fine photo mode, a series of frames are photographed from the same scene, and the camera records data of correlation between the frames of the same series in a data recording medium. When a printer reads the correlation data from the data recording medium, the printer composes a high quality image from image data of the series of frames, and makes a print of the high quality image.

According to another photographic system of the present invention, a literal photo mode is provided for a scene containing a literal image. The camera records data representative of the literal photo mode in association with each frame taken in the literal photo mode. When a printer reads the data representative of the literal photo mode, the printer processes image data to improve the resolution and contrast of the literal image of the frame, and makes a hard copy of the literal image from the processed image data. Thus, the hard copy of the literal image has a sufficient quality enough for use as a document or letter.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 1 is a block diagram of a digital still camera for use in a photographic system according to a first embodiment of the invention;

FIGS. 2A, 2B, 2C and 2D are explanatory views illustrating a divisional photo mode of the first embodiment;

DETAILED DESCRIPTION OF THE PREFERRED EMBODIMENTS

Figure 3A:
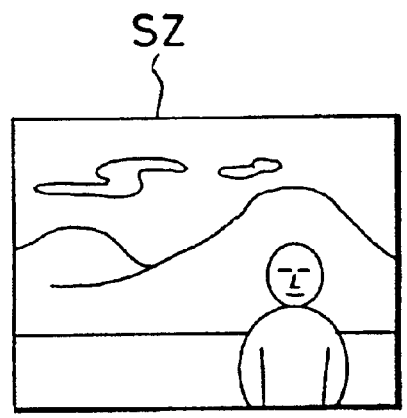
FIGS. 3A, 3B, 3C and 3D are explanatory views illustrating a stepped zooming mode of the first embodiment.
Figure 3B:
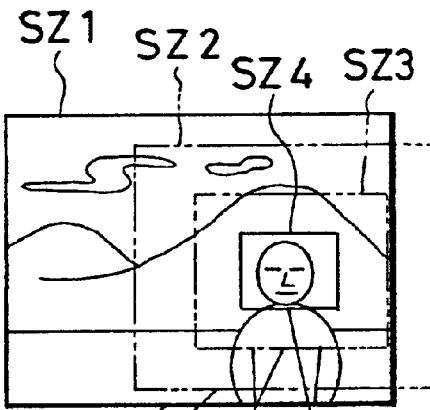
Figure 3C:
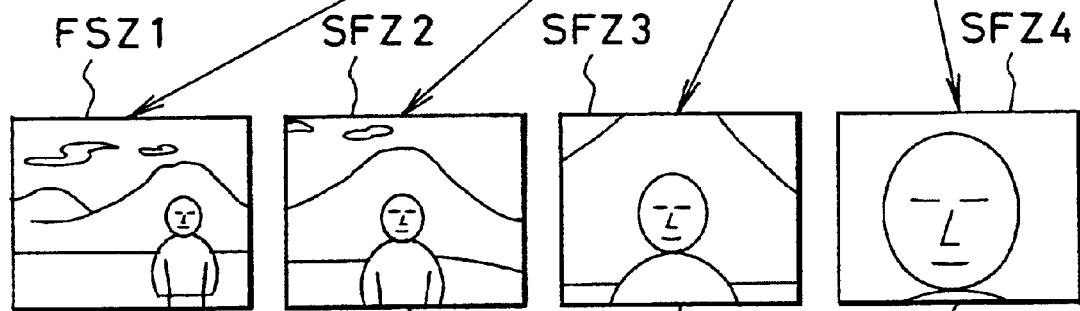

Referring to FIG. 1, a digital still camera 10 is constituted of an imaging section 11, an image processing section 12, a buffer memory 13, a system controller 14, and an image data writing section 15. The imaging section 11 picks up analog image signal from a subject. The image processing section 12 subjects the image signal to the gamma conversion and other well-known image processing steps, and converts it into digital image data. The buffer memory 13 stores the image data temporarily.

In the image data writing section 15, the image data read out from the buffer memory 13 is compressed frame by frame at a ratio of 1/10 to 1/20 according to JPEG (Joint Photographic Experts Group) method. The compressed image data is written frame by frame in an IC memory card 16. The image data may be compressed according to another known method.

The system controller 14 may be a microcomputer which is provided with MPU 17, RAM 18, ROM 19 and other well-known components, and also a data input section 20 for selecting a photographic mode and entering photographic data, and a display device 21 for displaying the photographic data and the photographic mode. In addition, a release button and other operation members of the camera 10 are connected to the system controller 14. The data input section 20 is provided with a plurality of push button switches. The ROM 19 stores a program for sequentially controlling the entire operation of the camera 10. The imaging section 11 consists of an imaging lens 22, a lens shifting device 23, a zooming device 24, and an image area sensor 25, e.g. a single-plate type or a triple-plate type CCD image area sensor.

The camera 10 may be manually set in a photo mode, including an ordinary photo mode where a photographic scene is recorded in a full size frame upon one actuation of the release button, and a fine photo mode. The fine photo mode includes a divisional photo mode, a stepped zooming mode, a stepped focusing mode, a stepped exposure value mode, a successive exposure mode, and a pixel shifting mode, in each of which a photographic scene is recorded in a plurality of frames under a series of different photographic conditions in response to one shutter release operation.

In the divisional photography mode, a photographic scene is divided into a number of divisions in a predetermined arrangement, so each division is photographed as a photographic field in a full size frame by use of the entire imaging surface of the imaging section 11. For example, as shown in FIGS. 2A to 2D, a photographic scene S is divided into four divisions S1, S2, S3 and S4, and four frames FS1, FS2, FS3 and FS4 are sequentially photographed from the respective divisions S1 to S4. In association with each of these four frames FS1 to FS4, position data of the corresponding division S1 to S4 within the scene S is recorded. For example, the position data represents relative coordinate values. The number of divisions is not to be limited to four, but may be two, six, eight, nine, twelve and so on.

In the divisional photography mode, the lens shifting device 23 moves the imaging lens 22 horizontally and/or vertically in a perpendicular plane to its optical axis so as to concentrate on one division after another, and then the zooming device 24 zooms up the imaging lens 22 to form an image of the one division on the entire imaging surface of the image area sensor 25. The amounts of horizontal and vertical movements and the zooming amount are predetermined for each division according to the number and arrangement of divisions, and are previously written in the ROM 19. Focusing is made division by division, or may be made scene by scene. It is also possible to manually preset a focusing range prior to the shutter release or select a focusing range by well-known focus-locking. The focus-locking is effected by depressing the release button halfway while locating a subject of an appropriate distance in the center of photographic field, and keeping the release button depressed halfway while framing an appropriate scene structure. In most cases, it is preferable to use the same exposure amount for each division of the same scene. As for extreme back-lit scenes, however, it may be preferable to change the exposure amounts for the individual divisions. In that case, data of the exposure amounts should be recorded as photographic data.

As the position data of the individual division, it is possible to use a simple serial number instead of the relative coordinate values. For example, if the scene S is the third scene in the sequence of recording in the memory card 16, the frames FS1 to FS4 are allotted with serial numbers "3-1", "3-2", "3—3" and "3-4" respectively.

In the stepped zooming mode, the photographer first determines a focusing range by focus-locking at a main subject and then determines an appropriate scene structure by framing. Thereafter when the shutter is released by depressing the release button to the full, the camera 10 detects the direction and amount of movement from the focus-locked position to the shutter released position through a not-shown sensor, and writes data of the camera movement in the RAM 18.

As shown for example in FIGS. 3A to 3D, upon full depression of the release button, the camera 10 sequentially photographs four frames FSZ1, FSZ2, FSZ3 and FSZ4 respectively from four different photographic fields SZ1, SZ2, SZ3 and SZ4. The first photographic field SZ1 covers the entire scene SZ. After taking the first photographic field SZ1, the imaging lens 22 is moved perpendicularly to the optical axis by the lens shifting device 23 into a position where the main subject is on the optical axis of the imaging lens 22, while the camera 10 frames the same scene SZ. The direction and amount of movement of the imaging lens 22 is determined based on the camera movement data written in the RAM 18. Thereafter, the second to fourth photographic fields SZ2 to SZ4 are photographed while the zooming device 24 varies focal length of the imaging lens 22 in three steps from a default value that is used for the first photographic field SZ1.

The stepped zooming frames FSZ1 to FSZ4 are sequentially stored in the memory card 16 along with photographic data: data indicating that these frames FSZ1 to FSZ4 are taken in the stepped zooming mode and data of the focal length or image magnification used for each frame FSZ1 to FSZ4. The number of zooming steps or stepped zooming frames obtained upon one shutter release operation may be other than four, e.g. two, three, five, six, etc. Instead of the focus-locking, it is possible to automatically determine a main subject and focus on that main subject by use of a known main subject discrimination device.

In the stepped focusing mode, a scene is photographed a plurality of times while varying focusing position of the imaging lens 22, that is, at different object distances. In this mode, a shortest subject distance and a longest subject distance are detected from several points of the scene, and a plurality of, e.g. four, object distances are determined stepwise from the shortest to longest subject distances of the scene. Then, the imaging lens 22 is stepwise moved to the focusing positions while one frame is photographed at each focusing position. A series of frames photographed in this way are recorded with data indicating that these frames have been taken as one unit in the stepped focusing mode, e.g. photographic data "FSP1" to "FSP4" for four steps of focusing. The number of focusing steps may be two, three, four, five and so on.

In the stepped exposure value mode, a scene is photographed a plurality of times while varying exposure value. In this mode, a lowest subject brightness and a highest subject brightness are detected from several points of the scene, so a maximum exposure value Emax and a minimum exposure value Emin are determined based on the lowest and highest subject brightness values within an available or capable exposure value range for the imaging device. Then, the scene is photographed at a plurality of exposure values ranging from the maximum exposure value Emax to the minimum exposure value Emin, one frame at one exposure value. A series of frames photographed in this way are recorded with data indicating that these frames have been taken as one unit in the stepped exposure value mode, e.g. photographic data "FSE1" to "FSE4" for four steps of exposure values.

In the successive exposure mode, a series of frames are photographed from a scene in a continuous succession. These successive frames are also recorded along with photographic data representative of the successive exposure mode.

In the pixel shifting mode, a plurality of frames is photographed from a scene, while the image of the scene formed on the imaging surface of the image area sensor 25 is shifted for each frame vertically and horizontally by an amount less than the vertical and horizontal lengths of one pixel of the image area sensor 25. These pixel shifted frames are also recorded along with photographic data representative of the pixel shifting mode.

Figure 4:
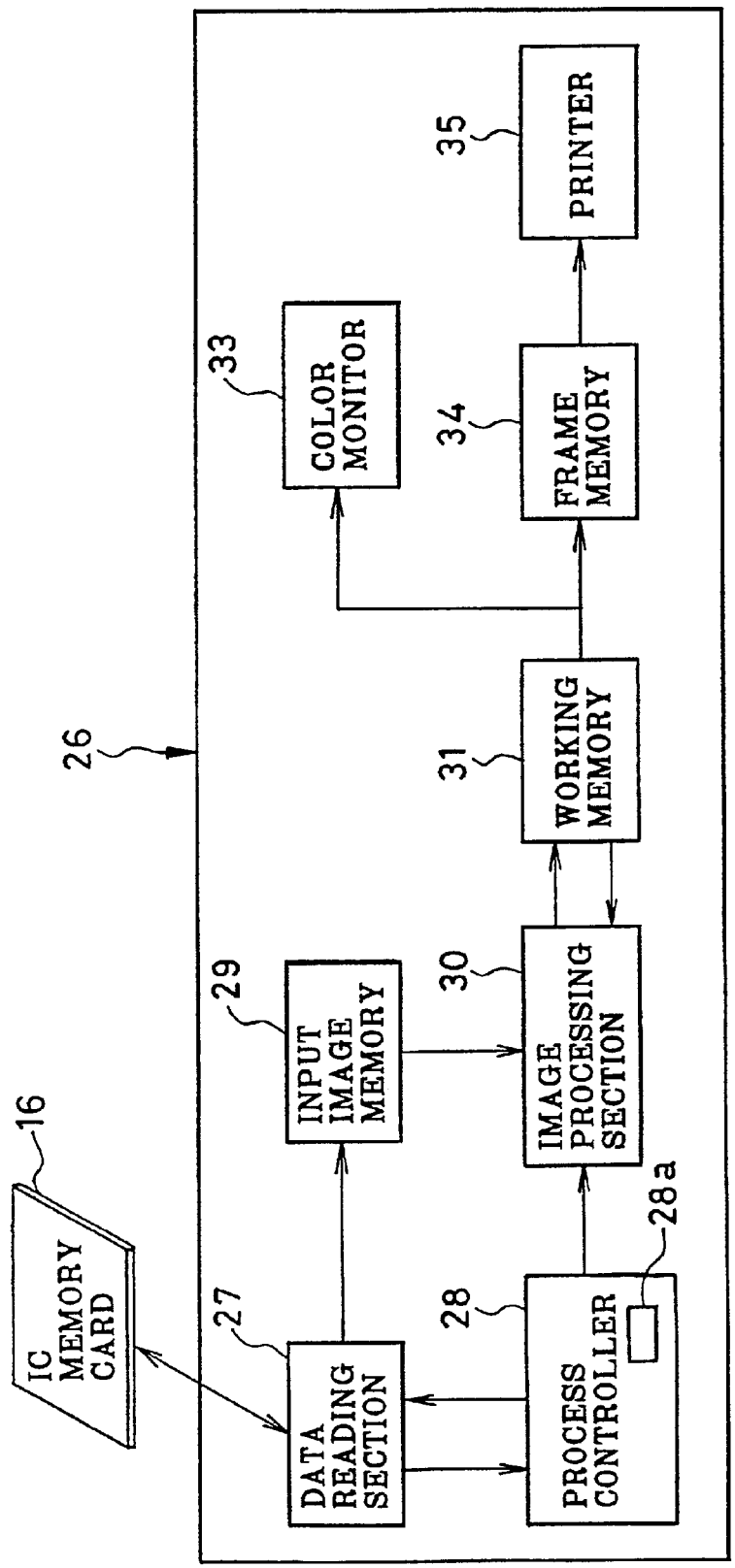
FIG. 4 is a block diagram of a digital printer unit for use in the photographic system of the first embodiment.

As shown in FIG. 4, the digital printer unit 26 is constituted of a data reading section 27, a process controller 28, an input image memory 29, an image processing section 30, a working memory 31, a color monitor 33, a frame memory 34 and a printer 35. The digital printer unit 26 is installed in a photo-lab. The photographer forwards the IC memory card 16 to the photo-lab, so photo prints are produced from the data recorded in the IC memory card 16.

The IC memory card 16 is loaded in the data reading section 27, which reads the image data and the photographic data from the card 16. The image data is stored in the input image data memory 29. The photographic data is sent to and decoded by the process controller 28.

The image processing section 30 processes or composes the image data in accordance with the photographic data. The image processing section 30 processes any image data by conventional image processing steps such as gammer correction, matrix conversion, letter-illustration composing, enlargement or reduction, data cropping or trimming. In addition, if the photographic data designates one of the fine photo mode, the image processing section 30 processes and composes the image data of a series of frames with reference to the working memory 31, to make a high definition photo print. The image data thus processed is sent to the color monitor 33 and the frame memory 34. The color monitor 33 displays a video image simulating a photo print that would be produced from the processed image data. The image data stored in the frame memory 34 is used by the printer 35.

Figure 5:
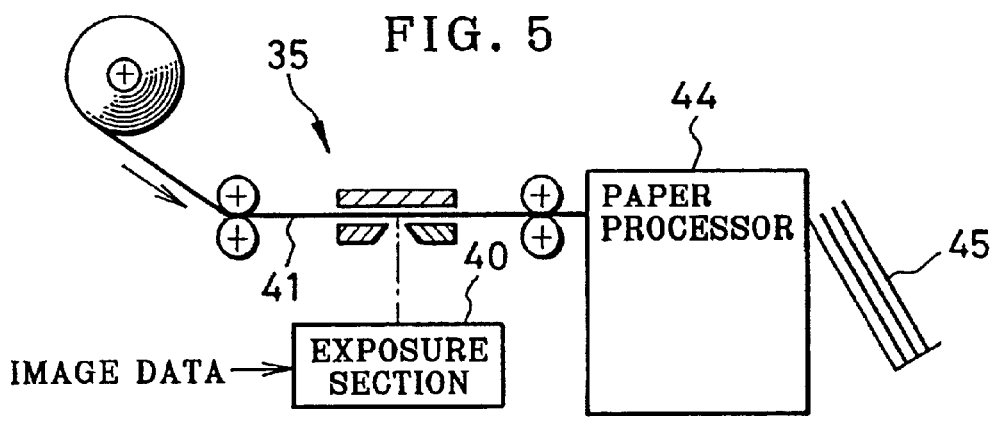
FIG. 5 is a schematic diagram of a printer adoptable in the digital printer unit of FIG. 4.

According to an embodiment shown in FIG. 5, the printer 35 is a Laser printer having an exposure section 40 which projects Laser beams of three primary colors while modifying the beams in accordance with the image data from the frame memory 34, to scan silver-salt color photographic paper 41 synchronously with transport of the paper 41. Three color photosensitive layers of the photographic paper 41 are thus sequentially exposed to the Laser beams to record three color pixels of the image. The exposed color paper 41 is developed and finished through a paper processor 44, and is cut into individual photo prints 45.

Figure 6:
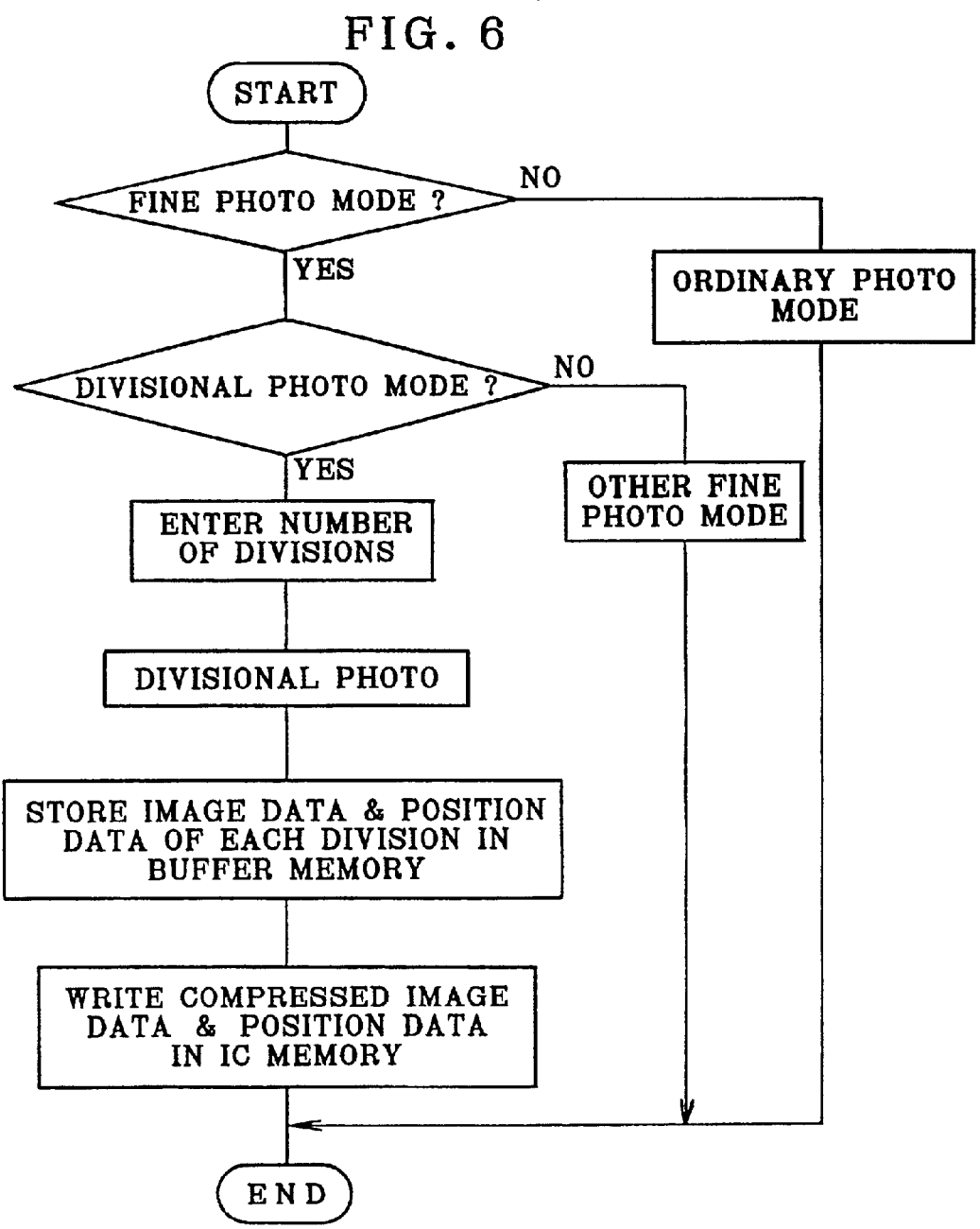
FIG. 6 is a flow chart illustrating an operation of the digital still camera of FIG. 1.

The above photographic system consisting of the digital still camera 10 and the digital printer unit 26 operates as follows:

As shown in FIG. 6, the camera 10 discriminates the selected mode. If, for example, the divisional photo mode is selected, the camera 10 refers to the designated number of divisions. According to the present embodiment, the default number of divisions is four, and the photographer can also select one of two-, six-, eight-, nine- and twelve-division photograph.

After the number of divisions is determined, the photographer depresses the release button while framing the scene S. When the four-division photograph is selected, as shown in FIG. 2B, the imaging lens 22 is first moved into a position where the optical axis is placed in the center of the first division S1, and is zoomed at an image magnification ratio specific to the four-division photograph, so that the first division S1 is photographed as the first frame FS1, as shown in FIG. 2C. Image data of the first frame FS1 is written in the IC memory card 16 along with the corresponding photographic data through the image processing section 12, the buffer memory 13 and the image data writing section 15. In the same way, the second to fourth frames FS2 to FS4 are photographed from the second to fourth divisions S2 to S4, as shown in FIG. 2C, and image data of each of these frames FS2 to FS4 is sequentially written in the IC memory card 16 along with the corresponding photographic data.

When another mode of the fine photo mode is selected, a series of frames are photographed upon one shutter release operation in the way as set forth above, and image data of each frame is sequentially written in the IC memory card 16 along with the corresponding photographic data.

When the ordinary photo mode is selected, a frame is photographed upon one shutter release operation, and image data of the ordinary frame is written in the IC memory 16 in the sequence of exposure, along with photographic data indicating that the frame has been taken in the ordinary photo mode.

In the photo-lab, the image data read out from the IC memory card 16 is written in the input image data memory 29 in the sequence of recording. The photographic data read out from the IC memory card 16 is written in a buffer memory 28a of the process controller 28 in the sequence of recording.

When it is determined from the associated photographic data that the image data is of an ordinary frame, the image data is processed in the conventional way through the image processing section 30, and the processed image data is written in the working memory 31. Based on the processed image data, a video image simulating a subsequent photo print is displayed on the color monitor 33, so the photographer can decide whether the frame is to be printed or not, if necessary, after correcting printing conditions. When the frame is decided to be printed, its image data is written in the frame memory 34. Then, the printer 35 makes a photo print of an ordinary quality from the image data.

When the photographic data represents the divisional photo mode, the image data of the first frame FS1 is written in a first location of the working memory 31 that corresponds to the first division S1. The image data of the second frame FS2 is written in a second location of the working memory 31 that corresponds to the second division S2. The image data of the third frame FS3 is written in a third location of the working memory 31 that corresponds to the third division S3. The image data of the fourth frame FS4 is written in a fourth location of the working memory 31 that corresponds to the fourth division S4. As a result, the working memory 31 is written with image data of the entire scene S, wherein border positions between the divisions S1 to S4 are corrected by subjecting the image data of the frames FS1 to FS4 to a conventional local pattern matching process. The image data of the entire scene S obtained in this way is written in the frame memory 34. Since the number of pixels used for photographing one scene is higher than, i.e. quadruple, that used in the ordinary photo mode, the resolving power is correspondingly higher than ordinary, so the grain fineness of the photo print is improved.

Figure 3D:
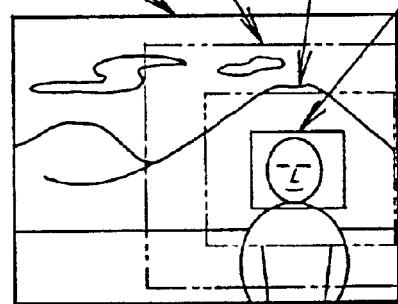

When the photographic data represents the stepped zooming mode, the image processing section 30 first reads the image data of the first zooming frame FSZ1 from the input image memory 29, and writes it in the working memory 31 in the way as shown in FIG. 3D. As the working memory 31 consists of a greater number of pixels than that used for photographing the first photographic field SZ1, interpolation is performed. Then, the image data of the second zooming frame FSZ2 is read and processed for pattern-matching with the image data of the first zooming frame FSZ1 by use of data representative of main subject position and magnification ratio of the second zooming frame FSZ2. Thereby, the image data of the second zooming frame FSZ2 takes the place of those image data pieces of the first zooming frame FSZ1 which are taken from the same scene area as the second photographic field SZ2. Next, among the image data of the second zooming frame FSZ2, those image data pieces taken from the same scene area as the third photographic field SZ3 are replaced with the image data of the third zooming frame FSZ3 through the pattern-matching operation. In the same way, the image data of the fourth zooming frame FSZ4 is composed with the image data of the third zooming frame FSZ3 by pattern-matching. In this way, the first to fourth zooming frames FSZ1 to FSZ4 ate composed in the way as implied by phantom lines in FIG. 3D. Since the fourth zooming frame FSZ4 is photographed at the highest resolution, the resolution of the composite image is the highest in the main subject area, and lowered toward the peripheral area.

When the photographic data represents the stepped focusing mode, focusing conditions of each of a series of stepped focusing frames are detected by differentiating each pixel with peripheral pixels. Because the differential values decrease as the image goes out of focus, it is possible to extract in-focus areas from the individual frames based on the differential values. Then, those image data pieces involved in the in-focus areas are written in the working memory 31 such that the in-focus areas of the respective frames are composed into an image. That is, the whole area of the composite image is in focus. In this way, it is possible to photograph a totally in-focus picture, especially a landscape, regardless of the depth of field of the imaging lens 22.

Instead of using pixel values of those pixels involved in the in-focus areas, a weighted average of the pixels' values of the same position in the respective frames may be used as a pixel value of that position in the composite image. In that case, a largest weighting coefficient should be used for those pixels involved in the in-focus areas.

When the photographic data represents the stepped exposure value mode, luminance values of a frame that is taken at a middle exposure value of the used exposure values are detected, and those areas where the luminance values are above a predetermined value are eliminated by use of a histogram method or a simple threshold value or another conventional method. In the same way, those areas of the middle exposed frame where the luminance values are below a predetermined value are eliminated. For the eliminated areas, those pixel values within the range between the predetermined values, which are selected from corresponding areas of any of other relating frames, are used. It is possible to control gradation of each of the high luminance range, the middle luminance range and the low luminance range in view of density balance of the entire scene by processing the image data through clipping, range-confining, gradation-conversion within each range or the like. This is effective to avoid density unbalance in the composite image, e.g. lower image density in an actually higher brightness area of the scene than that in an actually lower brightness area. According to the stepped exposure value mode, it is possible to prevent over-exposure in high brightness areas of the scene and under-exposure in low brightness areas of the scene: white compression, black compression, or under-exposure of a main subject in a back-lit photography.

When the photographic data represents the successive exposure mode, an image of the scene photographed in this mode is composed of average values or middle values of the corresponding pixels of the successive frames. Because of the performance of the imaging device, the original pixel values suffer from noise. By averaging image data of the successively photographed frames, S/N ratio of the image data is reduced. For a distant low brightness subject which cannot be illuminated by a flash light, a better image quality is obtained by the successive exposures. Since it is possible to reduce the amount of illumination light for one exposure, it is possible to avoid over-exposure due to over-illumination. A shorter shutter speed is necessary for one exposure compared with a single exposure even when the subject brightness is low. Therefore, hand-shaking is prevented, and thus the image quality is improved.

When the photographic data represents the pixel shifting mode, the image data of a series of frames are composed to virtually increase the resolution of the consequent image relative the resolving power of the image area sensor 25.

The composed or ordinarily processed image data is transferred from the working memory 31 to the frame memory 34. The printer 35 makes a photo-print based on the image data from the frame memory 34.

The present invention is applicable to a silver-salt photographic camera. In that case, a series of frames of one scene are photographed on a silver-salt photo filmstrip, and corresponding photographic data is recorded in an IC memory card, on magnetic recording medium such as magnetic tape or magnetic track on the photo filmstrip, or through optical recording device. In order to make a photo-print from the series of frames, image data of these frames is picked up by a scanner from the developed photo filmstrip, and the image data is processed and composed according to the photographic data in the same way as described above.

It is possible to omit the lens shifting device 23 and frame the respective divisions by hand after entering the number of divisions. In that case, borders between the divisions are adjusted by pattern-matching on the side of a digital printer. This embodiment is preferable for compactness and simple structure of the camera.

Also in the stepped zooming mode, it is possible to move the imaging lens 22 stepwise to a number of zooming positions by hand, instead of the above automatic zooming. In that case, pattern-matching between the step-zoomed frames of the same subject should be carried out to produce a composite image.

The exposure section 40 may be of area-exposure type or line-exposure type using an CRT screen or a LCD panel. As another scanning-exposure type, a micromirror device may be used for the exposure section 40.

The micromirror device is a spatial modulator consisting of micromirrors arranged in an array or a matrix, and the tilt angle of the individual micromirror is controlled to deflect incident light. If a negative-to-positive type photographic paper is used, the image data should be subjected to a well-known positive-to-negative conversion in the image processing section 30 or in the printer 35.

The printer 35 is not to be limited to the color Laser printer using silver-salt photographic paper, but may be any kind of printer which makes prints based on digital image data, including a color thermal transfer printer, a color ink-jet printer, a color thermosensitive printer, and a color Laser printer using ordinary paper.

Figure 7:
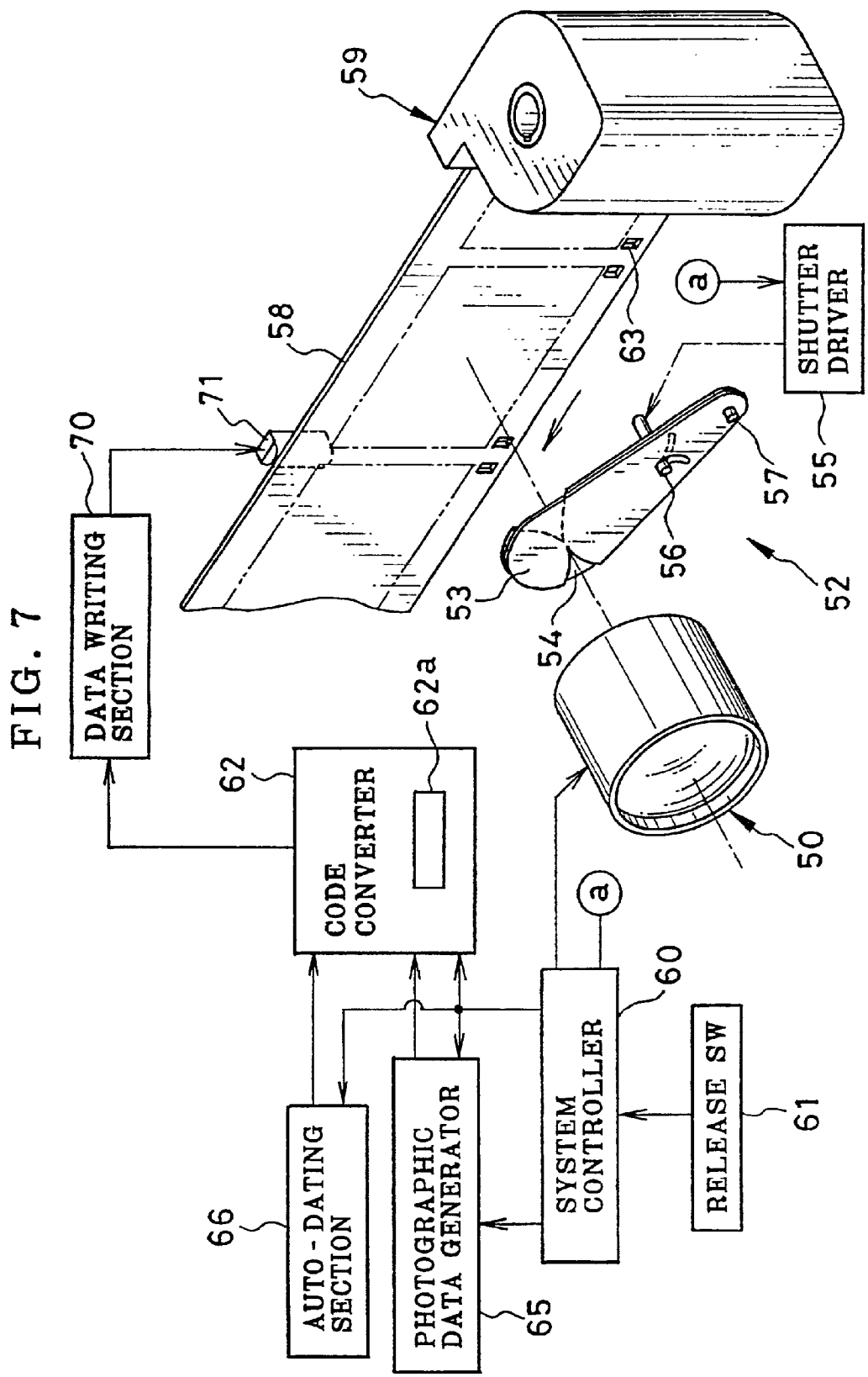
FIG. 7 is a schematic diagram of a camera for use in a photographic system according to a second embodiment of the invention.

FIG. 7 shows a camera used in a photographic system according to another embodiment of the invention. An imaging lens 50 can be manually or automatically focused. A program-controlled shutter mechanism 52 is disposed behind the imaging lens 50. For example, the shutter mechanism 52 is constituted of a pair of shutter blades 53 and 54 and a shutter driver 55 which moves a movable pin 56 toward a stationary pin 57 to open the shutter blades 53 and 54 for exposing a photo filmstrip 58.

The imaging lens 50, the shutter mechanism 52 and other not-shown mechanisms of the camera are sequentially controlled by a system controller 60 that may be a well-known microcomputer. Each time a release switch 61 is actuated, the system controller 60 makes an exposure, advances the filmstrip 58, and records various photographic data on transparent magnetic recording track. In the shown embodiment, the magnetic recording track is formed on the back surface of the photo filmstrip 58, but it may be formed on the front surface. The filmstrip 58 is able to advance out of a cassette shell 59 after the entire length is wound into the cassette shell 59. The filmstrip 58 is provided with a pair of perforations 63 per frame, so the individual frame can be positioned with reference to the perforations 63.

The camera further has a code converter 62, a photographic data generator 65 and an auto-dating section 66. The photographic data generator 65 receives signals from the system controller 60 and other not-shown sensors and generates from the signals photographic data such as data of light source type, data of focal length of the imaging lens 50, data of subject distance, and data of whether flash light is used or not. As the photographic data, literal photo data indicating that an assigned frame contains a literal image may be recorded. The auto-dating section 66 sends date-of-photography data and the like to a not-shown date printer, and also to the code converter 62.

Figure 8A:
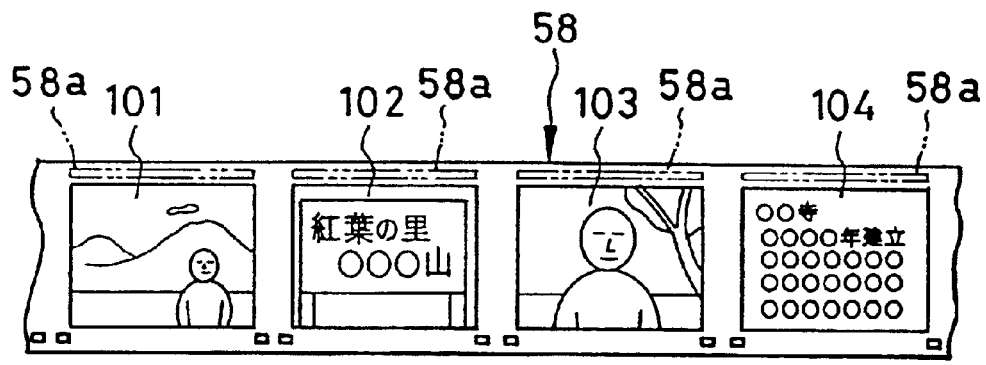
FIGS. 8A, 8B, 8C and 8D are explanatory views illustrating original frames and hard copies made from these frames according to the photographic system of the second embodiment.

The code converter 62 receives the number of exposed frames from the system controller 60, and codes the various photographic data for each exposed frame with reference to a coding standard stored in a built-in memory 62a. The coded photographic data is sent to a data writing section 70. The data writing section 70 drives a magnetic writing head during the one-frame advancing after each exposure, to write the coded photographic data on a magnetic recording track 58a of the photo filmstrip 58, as shown in FIG. 8A. A preferable coding method for the photographic data to record on the magnetic track 58a on the photo filmstrip 58 is disclosed in JPA 4-113347, corresponding to U.S. application Ser. No. 08/128,568. The magnetic head 71 may alternatively be driven during the film rewinding into the cassette shell 50 after all available frames of the filmstrip 58 are exposed, to write the photographic data of the respective frames successively. For this embodiment, it is necessary to store the photographic data of all frames in the memory 62a by the time of rewinding.

The system controller 60 operates in one of at least an ordinary photo mode and a literal photo mode. In the ordinary photo mode, each scene is photographed in an ordinary way and, if necessary, the photographic data is recorded on the magnetic recording track 58a. The literal photo mode is selected for a scene where letters or characters exist when the photographer wishes to reproduce the letters or characters at a high resolution in the print. Along with those frames taken in the literal photo mode, the literal photo data is recorded.

Besides fine printing data designating the literal image contained in the frame to be printed at the high resolution, the literal photo data includes paper type data designating a recording paper type. As the literal photo data, combination-printing data requiring the literal image be printed in combination with another frame is optionally recorded. The photographer can designate a recording paper type and/or a combination printing type of the literal image before or after each exposure in the literal photo mode.

According to the present embodiment, the photographer can choose between photosensitive paper and ordinary paper. When ordinary paper is chosen, the frame is printed on ordinary paper through an ink-jet printer, as set forth later in detail.

The combination-printing data consists of frame number data designating a frame to combine the literal image therewith, and position data designating a position of the literal image in the ordinary frame. In this embodiment, the frame number data represents a particular frame number designated by the photographer, or in default of manual designation of the frame number, the frame number data designates the frame preceding to the frame containing the literal image to combine. It is possible to designate a plurality of frames with which the literal image is to be combined.

As the position data, inside position data for designating a position inside the frame, outside position data for designating a position outside the frame or backside position data for designating a position backside of the frame may be recorded. The inside position data designates center, upper right, lower right, upper left or lower left of the print frame. The outside position data designates upper margin, lower margin, right margin or left margin of the print frame. For example, when the backside position is designated by the combination-printing data, the literal image is printed on the backside of the print frame through a backside printer. The backside printer is preferably a conventional one provided for printing the frame number or print-exposure correction data relating to the print frame.

Figure 9:
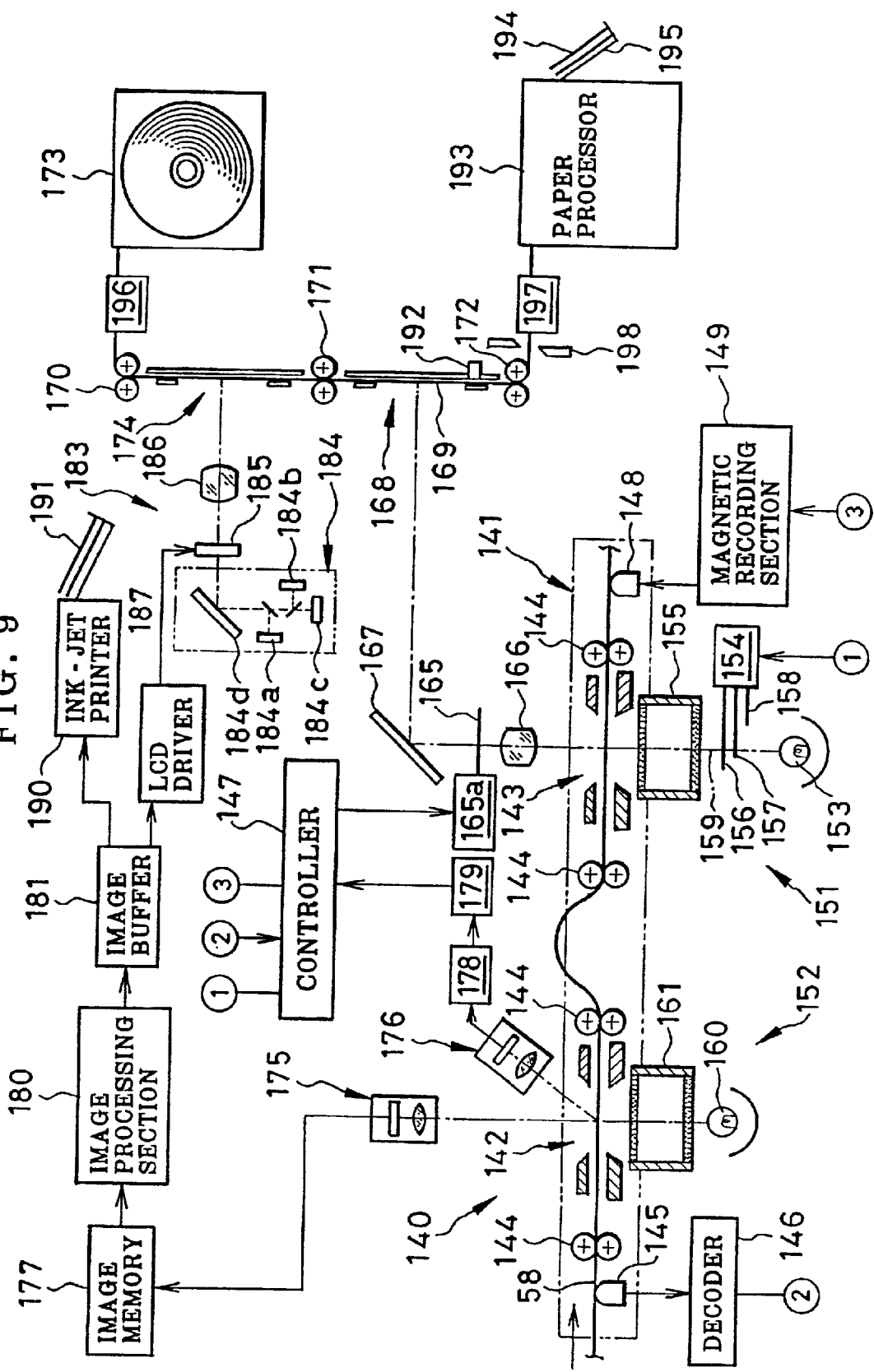
FIG. 9 is a printer-processor for use in the photographic system of the second embodiment.

The filmstrip 58 exposed by the above camera is developed and then placed in a film carrier 141 of a printer-processor 140 (see FIG. 9). The film carrier 141 is provided with an imaging aperture 142, a printing aperture 143 and feed roller pairs 144. The film carrier 141 positions the individual frames on the filmstrip 58 in the imaging aperture 142 and then in the printing aperture 143 turn by turn with reference to the perforations 63. The feed roller pairs 144 transport the filmstrip 58 such that a loop is formed between the two apertures 142 and 143.

A magnetic reading head 145 is disposed in the film carrier 141 at an upstream position of the imaging aperture 142, for reading the photographic data from the magnetic recording tracks 58a of the filmstrip 58. The photographic data is sent through a decoder 146 to a controller 147. The controller 147 sequentially controls all components of the printer-processor 140. A magnetic writing head 148 is disposed at a downstream position of the printing aperture 143. The writing head 148 is driven by a magnetic recording section 149 to write print data on magnetic recording tracks provided therefor on the filmstrip 58. The print data includes data of photo-lab ID number, print-exposure correction values, and date of film development.

Light source sections 151 and 152 are disposed on the opposite side of the filmstrip 58 from the printing aperture 143 and the imaging aperture 142 respectively. The light source section 152 for printing light consists of a white light source 153, a light controller 154, and a diffusion box 155. The light controller 154 controls insertion of three color filters 156, 157 and 158 into a printing light path, thereby to control quality and quantity of the printing light. The controlled printing light is diffused through the diffusion box 155, to equally illuminate each frame on the photo filmstrip 58 when placed in the printing aperture 143. The light source section 152 is constituted of a white light source 160 and a diffusion box 161, and illuminates each frame when it is placed in the imaging aperture.

The printing light travels through the frame positioned in the printing aperture 143 and is focused through a printing lens 166 and a mirror 167 onto color photographic paper 169 in a printing stage 168 only while a shutter 165 is opened by a shutter driver 165a. Through paper feed roller pairs 170, 171 and 172, the photographic paper 169 is withdrawn from a magazine 173, and is positioned in a letter printing stage 174 and then in the printing state 168.

The light travels through the frame positioned in the imaging aperture 142 and is received on an imaging device 175 for picking up image data of that frame, and is also received on an image scanner 176 which measures three color light values of each pixel of the frame. The image data from the imaging device 175 is stored in an image memory 177. The photometric values from the image scanner 176 are used for calculating characteristic values of each color, such as LAID, maximum and minimum values. Based on the characteristic values, a print-exposure amount operator 179 calculates print-exposure amounts by use of conventional operations. The controller 147 determines based on the print-exposure amounts the positions of the color filters 156 to 158 in the printing light path 159, so the light controller 154 inserts the filters 156 to 158 into the determined positions of the printing light path 159.

When the literal photo data is assigned, the image data stored in the image memory 177 is processed in an image processing section 180 to improve the contrast and resolution of the literal image, by use of one or several methods: edge-enhancement, binarization or conversion into binary image, monochromization or conversion into black-and-white image, and so forth. The processed image data of the literal image is stored in an image buffer 181 along with the literal photo data. It is possible to delete the background and extract data of the literal image. For example, an area containing the letters may be extracted by pattern-matching or other method. By deleting data of remaining areas, data of the literal image can be extracted.

A letter printing device 183 is disposed in the letter printing stage 174. The letter printing device 183 is constituted of a light source unit 184, an LCD panel 185, a printing lens 186 and an LCD driver 187. The LCD driver 187 is connected to the output of the image buffer 181. The light source unit 184 consists of red, green and blue LEDs 184a, 184b and 184c, which illuminate the LCD panel 185 through mirror 184d. The LCD panel 185 is driven by the LCD driver 187 based on the literal image data stored in the image buffer 181, 50 as to display a negative literal image. A negative literal image is formed onto the photographic paper 169 from the light from the LCD panel 185 through the printing lens 186, so that the literal image is recorded on the photographic paper 169.

The output of the image buffer 180 is also connected to an ink-jet printer 190 for printing the literal image in a positive form on ordinary paper 191 when ordinary paper is selected as the recording paper type. By printing the literal image on ordinary paper, the consequent hard copy is useful as a document, and it becomes possible to write in appropriate phrases on the side of the literal image.

The printer-processor 140 is further provided with a backside printer 192 for printing frame number or exposure correction data on the backside of photo print. For those frames which the backside print is designated by the letter photo data, the literal image is printed on the backside of the photographic paper 169 by the backside printer 192.

The exposed photographic paper 169 is developed by a paper processor 193, and is cut into individual photo prints 194. Designated by 195 is a tray, and 196 and 197 are paper loop reservoirs. Designated by 198 is a paper cutter for cutting an exposed portion of the photographic paper 169 from an unexposed portion when printing is interrupted.

The operation of the photographic system of the second embodiment will now be described.

Figure 10:
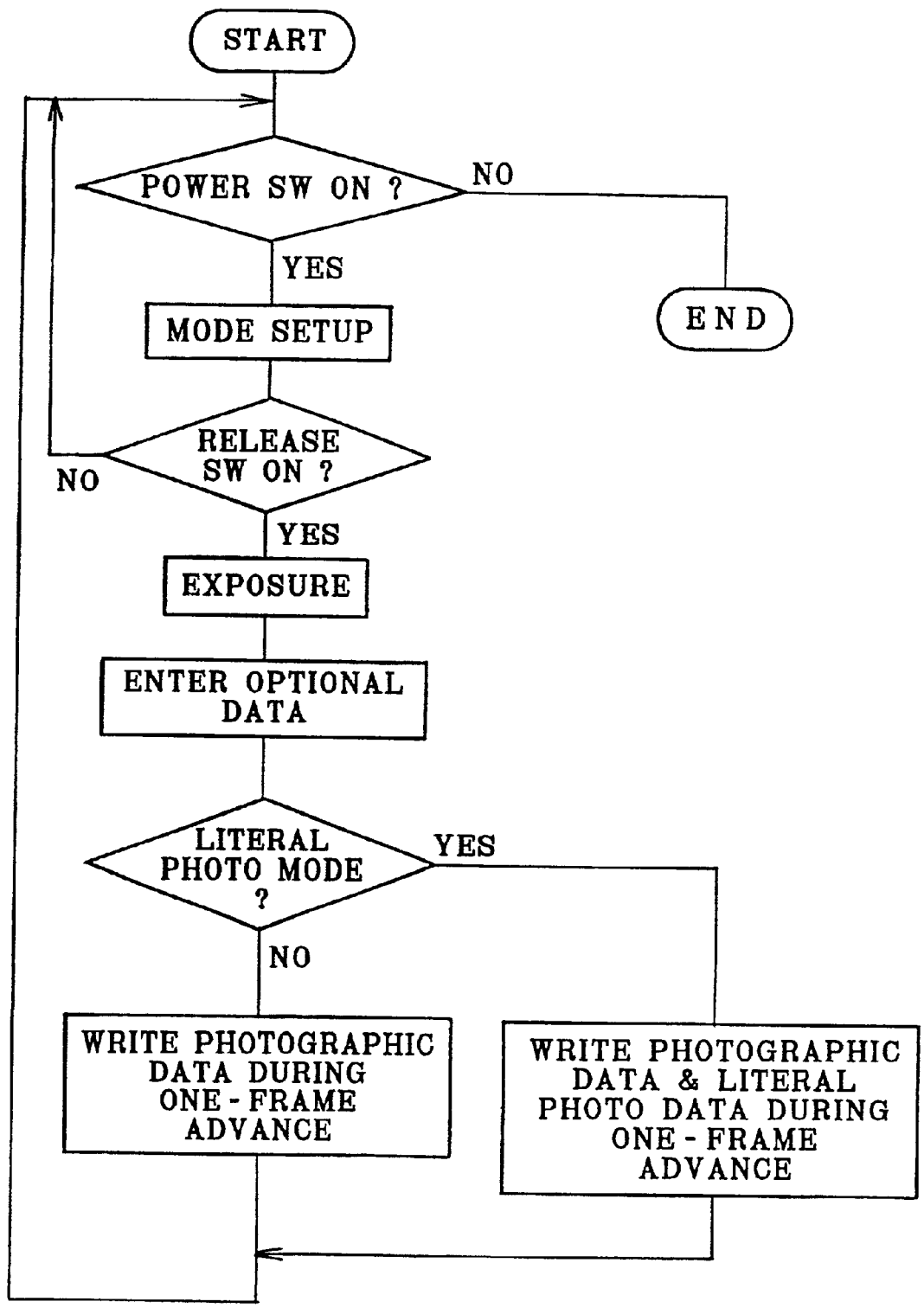
FIG. 10 is a flow chart illustrating an operation sequence of the camera of FIG. 7.

Referring to FIG. 10, when a not-shown power switch of the camera of FIG. 7 is turned on, first the photo mode is to set up. Thereafter when the release switch 61 is turned on, an exposure is effected on the photo filmstrip 58. If the literal photo mode is selected, the type of recording paper, or the combination-printing position of literal image, or other commands may be manually entered after the exposure. During one-frame advance after the exposure, photographic data relating to the just exposed frame is recorded on the magnetic recording track 58a. If the literal photo mode is selected, the literal photo data is included in the photographic data. The exposed photo filmstrip 58 with the magnetic data is forwarded to a photo-lab.

Figure 11:
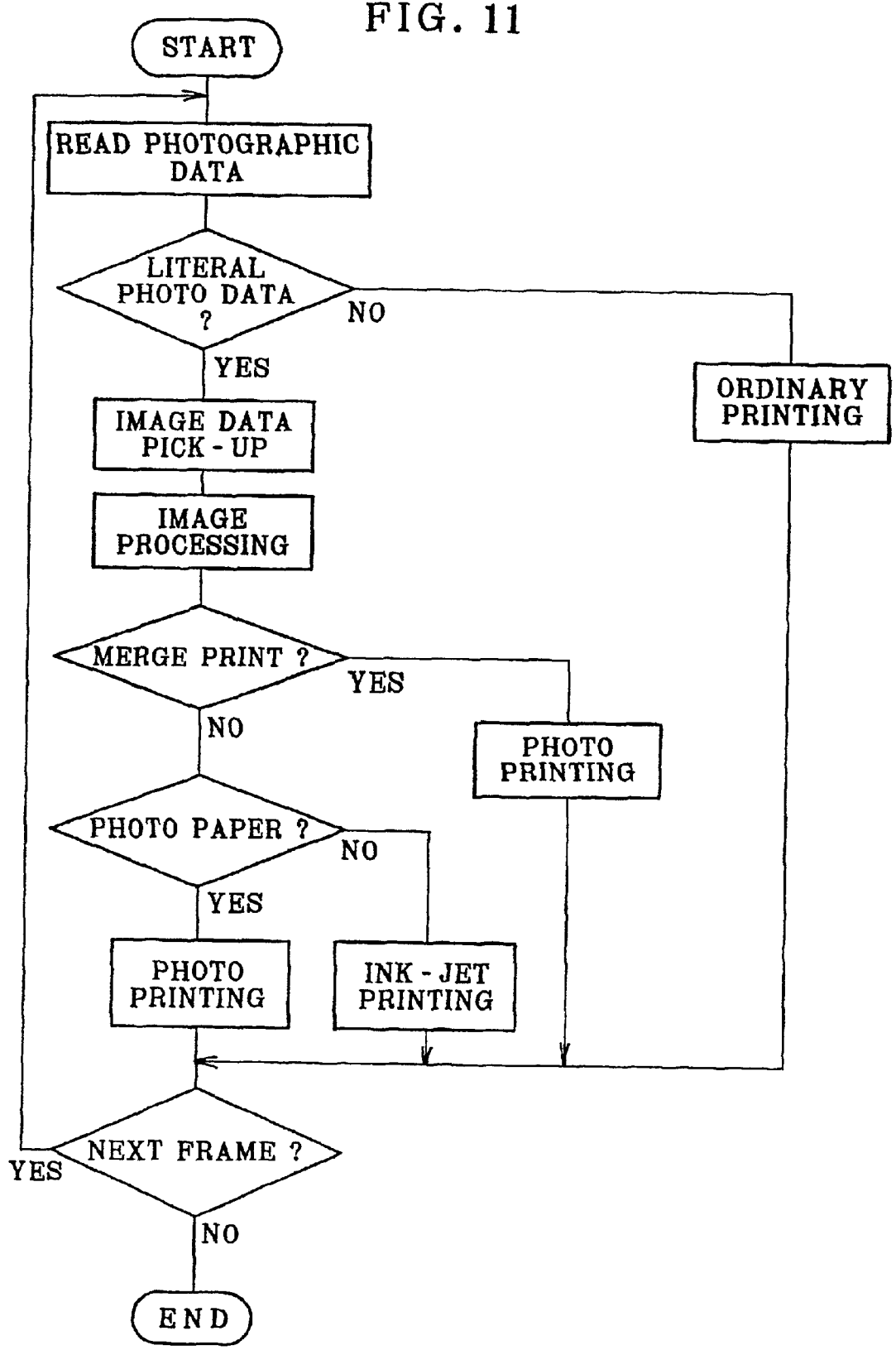
FIG. 11 is a flow chart illustrating an operation sequence of the printer-processor of FIG. 9.

In the photo-lab, the filmstrip 58, after being developed, is set in the film carrier 141. As shown in FIG. 11, first the photographic data is read out from the magnetic track 58a through the magnetic reading head 145. When the photographic data includes the literal photo data to indicate that the frame contain a literal image, the imaging section 175 picks up image data from that frame. The image data is stored in the image memory 177 and then processed in the image processing section 180, to improve the resolution and make the literal image clear and definite.

For ordinary frames, three color light values are detected through the scanner 176, and the ordinary frames are seriatim positioned in the printing aperture 143, to print the image onto the photographic paper 169 at the ordinary printing stage 168.

Figure 8B:
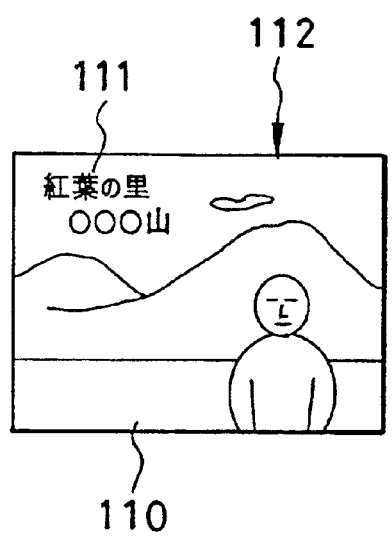

FIG. 8A shows an example wherein frames 101, 102, 103 and 104 are recorded on the filmstrip 158 in this sequence, and the first and third frames 101 and 103 are taken in the ordinary photo mode, whereas the second and fourth frames 102 and 104 are taken in the literal photo mode. For example, the photographic data relating to the second frame 102 includes combination-printing data that designates a literal image contained in the second frame 102 to be merged in the upper-left position of the first frame 101. In that case, image data of the second frame 102 is picked up by the imaging device 175, and image data of the literal image of the second frame 102 is extracted in the image processing section 180. Based on the image data of the literal image of the second frame 102 stored in the buffer memory 181, the LCD driver 187 drives the LCD 185 of the letter printing device 183 to print a literal image 111 on the photographic paper 169 at the upper-left position of a print frame in the letter printing stage 174. Thereafter, an image 110 of the first frame 101 is superimposed on the literal image 111, thereby providing a photo print 112 as shown in FIG. 8B.

Figure 8C:
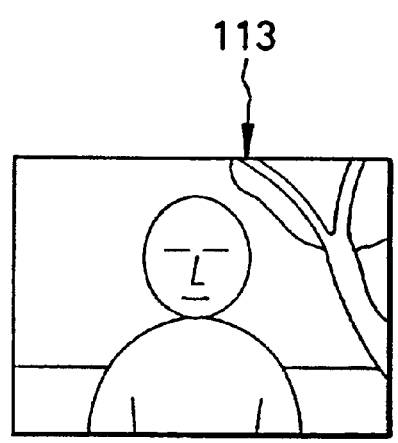
Figure 8D:
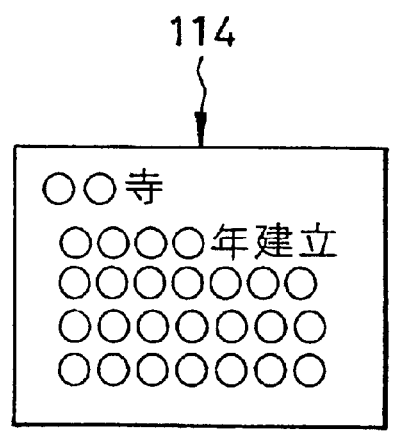

Since the third frame 103 is an ordinary frame, an ordinary photo print 113 as shown in FIG. 8C is made from the third frame 103.

When the literal photo mode data relating to the fourth frame 104 designates ordinary paper as the recording paper, the image data of the fourth frame 104 stored in the image buffer 181 is sent to the ink-jet printer 190, which makes a print or hard copy 114 of the fourth frame 104 on the ordinary paper 191.

On the other hand, when the photographic paper is selected as the recording paper for a frame taken in the literal photo mode, a literal image is printed on the photographic paper 169 through the letter printing section 183. But when the backside printing is designated, the literal image is printed by the backside printer 192 on the backside of the photographic paper 169. Even a frame containing a literal image, if the literal photo data is not recorded, the frame is printed at the ordinary printing stage 168.

The literal image picked up through the imaging device 175 may be processed by a conventional character recognition software, instead of the above image processing steps like edge-enhancement, binarization and monochromization. Thereby, word-processing such as font selection is possible for the ink-jet printer 190, the backside printer 192, and the letter printing device 183 as well.

As the letter printer 183, it is preferable to use an LCD printer that has conventionally been used for index-printing.

The LCD panel 185 may be replaced by a line LCD for printing the literal image line after line. A CRT may be substituted for the LCD panel 185. A laser printer may be useful for other types of letter printing devices. As other options of letter printers, there are a thermal transfer type printer and a thermosensitive type printer.

The second embodiment is applicable to a photographic system consisting of a digital still camera and a digital printer. In that case, the photographer can process image data of a photographed literal image appropriately through a personal computer. It is also possible to provide the digital still camera with a function to convert literal image data into a document.

The photo filmstrip 158 may be transported back and forth through the film carrier 141 of the printer-processor 140 such that the imaging device 175 and/or the scanner 176 picks up the individual frames on the filmstrip 158 in one way, and the printing is carried out during the transport in the opposite way. It is also possible to transport the filmstrip 158 one way but twice through the film carrier 141, such that the image data is picked up during the first transport, and that the printing is carried out during the second transport.

It is possible to compose a plurality of literal images into a hard copy or photo print. In that case, the plurality of literal images can be photographed from a plurality of originals or divisional portions of the same original. In the latter case, the literal images are composed by a conventional pattern-matching.

The literal photo mode data may be recorded in an IC memory card or another storage device, or may be optically recorded on the photo filmstrip.

Thus, the present invention should not be limited to the above embodiments but, on the contrary, various modifications may be possible to those skilled in the art without departing from the scope of claims attached hereto.

What is claimed is:

1. A photographic system comprising of a camera and a printer, the camera comprising:
    a mode selection device for selecting one of an ordinary photo mode and a fine photo mode;
    a photographic device for photographing one scene in one frame in the ordinary photo mode and a series of frames in the fine photo mode; the series being sequentially taken photos of division of a scene, wherein each division occupies a full photographic field of one of the frames; and
    a data recording device for recording data of correlation between the frames of the same scene on a recording medium in the fine photo mode,
    wherein the photographing of the one scene in one frame of the ordinary photo mode is made with one shutter release operation.

2. A photographic system as claimed in claim 1, wherein the printer comprising:
    a data reading device for reading the correlation data from the recording medium;
    an image processing device for processing image data detected from the frames of the same scene to compose a high definition image in accordance with the correlation data; and
    a printing device for printing a hard copy of the high definition image.

3. A photographic system as claimed in claim 2, wherein the data recording device records divisional position data in the relation to the frames taken from the division of the same scene.

4. A photographic system as claimed in claim 2, wherein the fine photo mode includes a stepped zooming mode, wherein the photographic device photographs a main subject of one scene at different focal lengths to obtain a full size frame at one focal length, and the data recording device records focal length data for each frame of the same main subject.

5. A photographic system as claimed in claim 4, wherein the camera further comprises a manually operable device for designating the main subject of one scene.

6. A photographic system as claimed in claim 4, wherein the camera further comprises a device for automatically discriminating the main subject of one scene.

7. A photographic system as claimed in claim 2, wherein the fine photo mode includes a stepped focusing mode, wherein the photographic device photographs one scene at different object distances, and the data recording device records data of object distances used for the frames of the same scene.

8. A photographic system as claimed in claim 2, wherein the fine photo mode includes a stepped exposure value mode, wherein the photographic device photographs one scene at different exposure values, and the data recording device records data of exposure values used for the frames of the same scene.

9. A photographic system as claimed in claim 3, wherein the camera further comprises a lens shifting device for shifting an imaging lens in a plane perpendicular to an optical axis of the imaging lens in the divisional photo mode, to move the optical axis to a center of one division after another in a predetermined sequence within the same scene, and a zooming device for zooming the imaging lens such that an image of one division is formed in a full size on an imaging surface of an imaging device or on photographic film.

10. A photographic system as claimed in claim 4, wherein the camera further comprises a lens shifting device for shifting an imaging lens in a plane perpendicular to an optical axis of the imaging lens in the stepped zooming mode, to position the main subject on the optical axis when the main subject is located out of a center area of the scene to be photographed.

11. A photographic system as claimed in claim 9, further including a ROM for storing pre-programmed data, which controls an amount that the optical axis is moved and an amount that the zooming lens is zoomed.

12. A camera comprising:
    a mode selection device for selecting one of an ordinary photo mode and a fine photo mode;
    a photographic device for photographing one scene in one frame in the ordinary photo mode and a series of frames in the fine photo mode; the series being sequentially taken photos of division of a scene, wherein each division occupies a full photographic field of one of the frames; and
    a data recording device for recording photographic data relating to each individual frame on a recording medium, the photographic data indicating correlation between the frames of the same scene photographed in the fine photo mode,
    wherein the photographing of the one scene in one frame in the ordinary photos mode is made with one shatter release operation.

* * * * *